(12) United States Patent
Wu et al.

(10) Patent No.: US 12,170,476 B2
(45) Date of Patent: Dec. 17, 2024

(54) MOTOR ROTOR COOLING SYSTEM

(71) Applicant: DELTA ELECTRONICS, INC., Taoyuan (TW)

(72) Inventors: Yi-Ming Wu, Taoyuan (TW); Shian-Min Tsai, Taoyuan (TW); Mu-Hsien Chou, Taoyuan (TW); Che-Ming Cheng, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 373 days.

(21) Appl. No.: 17/808,101

(22) Filed: Jun. 21, 2022

(65) Prior Publication Data
US 2023/0179065 A1   Jun. 8, 2023

(30) Foreign Application Priority Data
Dec. 8, 2021 (CN) .......................... 202111490581.8

(51) Int. Cl.
*H02K 9/193* (2006.01)
*H02K 1/28* (2006.01)
(Continued)

(52) U.S. Cl.
CPC ............... *H02K 9/193* (2013.01); *H02K 1/28* (2013.01); *H02K 1/32* (2013.01); *H02K 5/203* (2021.01)

(58) Field of Classification Search
CPC .......... B22F 1/052; B22F 10/28; B22F 10/36; B22F 10/64; B22F 10/66; B22F 5/04; B23K 2101/001; B23K 2103/26; B23K 26/0006; B23K 26/082; B23K 26/342; B33Y 10/00; B33Y 70/00; B33Y 80/00; C22C 9/06; F01D 17/162; F01D 5/186; F01D 5/187; F01D 5/28; F01D 9/041; F05D 2230/31; F05D 2230/41; F05D 2240/12; F05D 2250/20; F05D 2260/202;
(Continued)

(56) References Cited

U.S. PATENT DOCUMENTS

| 8,674,574 B2 * | 3/2014 | Hayslett .................. H02K 1/32 310/156.57 |
| 10,666,103 B2 * | 5/2020 | Yoshizawa ............... H02K 9/19 |

(Continued)

FOREIGN PATENT DOCUMENTS

| CN | 1966188 A | 5/2007 |
| CN | 213243761 U | 5/2021 |

(Continued)

*Primary Examiner* — Naishadh N Desai
(74) *Attorney, Agent, or Firm* — CKC & Partners Co., LLC

(57) ABSTRACT

A cooling system includes a rotor structure, a first end plate and a second end plate. The rotor structure includes a silicon steel, magnets and a shaft. The first end plate is at a first end of the silicon steel, and the first end plate is recessed with a first-shaped oil groove and a second-shaped oil groove. The second end plate is at a second end of the silicon steel, and the second end plate is recessed with a first-shaped oil groove and a second-shaped oil groove. The first-shaped oil groove of the first end plate is connected to the second-shaped oil groove of the second end plate to form a first cooling path. The second-shaped oil groove of the first end plate is connected to the first-shaped oil groove of the second end plate to form a second cooling path.

20 Claims, 10 Drawing Sheets

(51) Int. Cl.
*H02K 1/32* (2006.01)
*H02K 5/20* (2006.01)

(58) Field of Classification Search
CPC ............. F05D 2300/1723; Y02P 10/25; H02K 1/2766; H02K 1/28; H02K 1/32; H02K 5/203; H02K 9/193; Y02T 10/64
See application file for complete search history.

(56) References Cited

U.S. PATENT DOCUMENTS

| | | | |
|---|---|---|---|
| 10,778,053 B2 * | 9/2020 | Ito | H02K 7/085 |
| 11,283,332 B2 * | 3/2022 | Kitao | H02K 9/19 |
| 2009/0261667 A1 * | 10/2009 | Matsubara | H02K 1/2766 |
| | | | 310/54 |

FOREIGN PATENT DOCUMENTS

| | | | |
|---|---|---|---|
| JP | 2010239799 A | 10/2010 | |
| JP | 2015056966 A | 3/2015 | |
| TW | M460931 U | 9/2013 | |

* cited by examiner

MOTOR ROTOR COOLING SYSTEM

CROSS-REFERENCE TO RELATED APPLICATION

This application claims priority to China Application Serial Number 202111490581.8, filed Dec. 8, 2021, which is herein incorporated by reference in its entirety.

BACKGROUND

Field of Invention

The present disclosure relates to a motor rotor, and more particularly to a motor rotor cooling system.

Description of Related Art

A conventional vehicle motor has its gap between a silicon steel sheet and its shaft to construct a cooling oil circulation channel. However, a conventional cooling oil circulation channel has the disadvantages of poor cooling performance and uneven temperature distribution. In view of such issue, motor manufacturers are actively looking for solutions to effectively improve the cooling oil circulation channel and enhance the performance of the motor.

SUMMARY

The present disclosure proposes a hairpin wire motor stator for overcoming or alleviating the problems of the prior art.

In one or more embodiments, a motor rotor cooling system includes a rotor structure, a first end plate and a second end plate. The rotor structure includes a silicon steel, magnets and a shaft. The shaft has a shaft oil channel, a shaft oil inlet and a shaft oil outlet, wherein the shaft oil inlet and the shaft oil outlet is connected to the shaft oil channel, the silicon steel has magnet slots to accommodate the magnets respectively. The first end plate is located at a first end of the silicon steel, the first end plate is recessed to form at least one first-shaped oil groove and at least one second-shaped oil groove, the first end plate has at least one first plate oil outlet that is connected to the first-shaped oil groove. The second end plate is located at a second end of the silicon steel, the second end plate is recessed to form at least another first-shaped oil groove and at least another second-shaped oil groove, the second end plate has at least one second plate oil outlet that is connected to the first-shaped oil groove of the second end plate. The first-shaped oil groove of the first end plate is connected to the second-shaped oil groove of the second end plate via a corresponding one of the magnet slots to form a first oil cooling path, and the second-shaped oil groove of the first end plate is connected to the first-shaped oil groove of the second end plate via a corresponding one of the magnet slots to form a second oil cooling path.

In one or more embodiments, a motor rotor cooling system includes a rotor structure, a first end plate and a second end plate. The rotor structure includes a silicon steel, magnets and a shaft. The shaft has a shaft oil channel, a shaft oil inlet and a shaft oil outlet, wherein the shaft oil inlet and the shaft oil outlet is connected to the shaft oil channel, the silicon steel has magnet slots to accommodate the magnets respectively. The first end plate is located at a first end of the silicon steel, the first end plate is recessed to form at least one first-shaped oil groove and at least one second-shaped oil groove, the first end plate has at least one first plate oil outlet that is connected to the first-shaped oil groove. The second end plate is located at a second end of the silicon steel, the second end plate is recessed to form at least another first-shaped oil groove and at least another second-shaped oil groove, the second end plate has at least one second plate oil outlet that is connected to the first-shaped oil groove of the second end plate. An overall shape formed by the first-shaped and second-shaped oil grooves of the first end plate is substantially the same as an overall shape formed by the first-shaped and second-shaped oil grooves of the second end plate.

In one or more embodiments, a motor rotor cooling system includes a rotor structure, a first end plate and a second end plate. The rotor structure includes a silicon steel, magnets and a shaft. The shaft has a shaft oil channel, a shaft oil inlet and a shaft oil outlet, wherein the shaft oil inlet and the shaft oil outlet is connected to the shaft oil channel, the silicon steel has magnet slots to accommodate the magnets respectively. The first end plate is located at a first end of the silicon steel, the first end plate is recessed to form at least one first-shaped oil groove and at least one second-shaped oil groove, the first end plate has at least one first plate oil outlet that is connected to the first-shaped oil groove. The second end plate is located at a second end of the silicon steel, the second end plate is recessed to form at least another first-shaped oil groove and at least another second-shaped oil groove, the second end plate has at least one second plate oil outlet that is connected to the first-shaped oil groove of the second end plate. An overall shape formed by the first-shaped and second-shaped oil grooves of the first end plate is mirror-symmetrical to an overall shape formed by the first-shaped and second-shaped oil grooves of the second end plate.

The motor rotor cooling system disclosed herein is equipped with a plurality of different cooling oil paths through the oil grooves of different shapes recessed on the first and second end plates and a plurality of magnet slots running through the silicon steel such that the motor rotor can be cooled more efficiently and uniformly.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
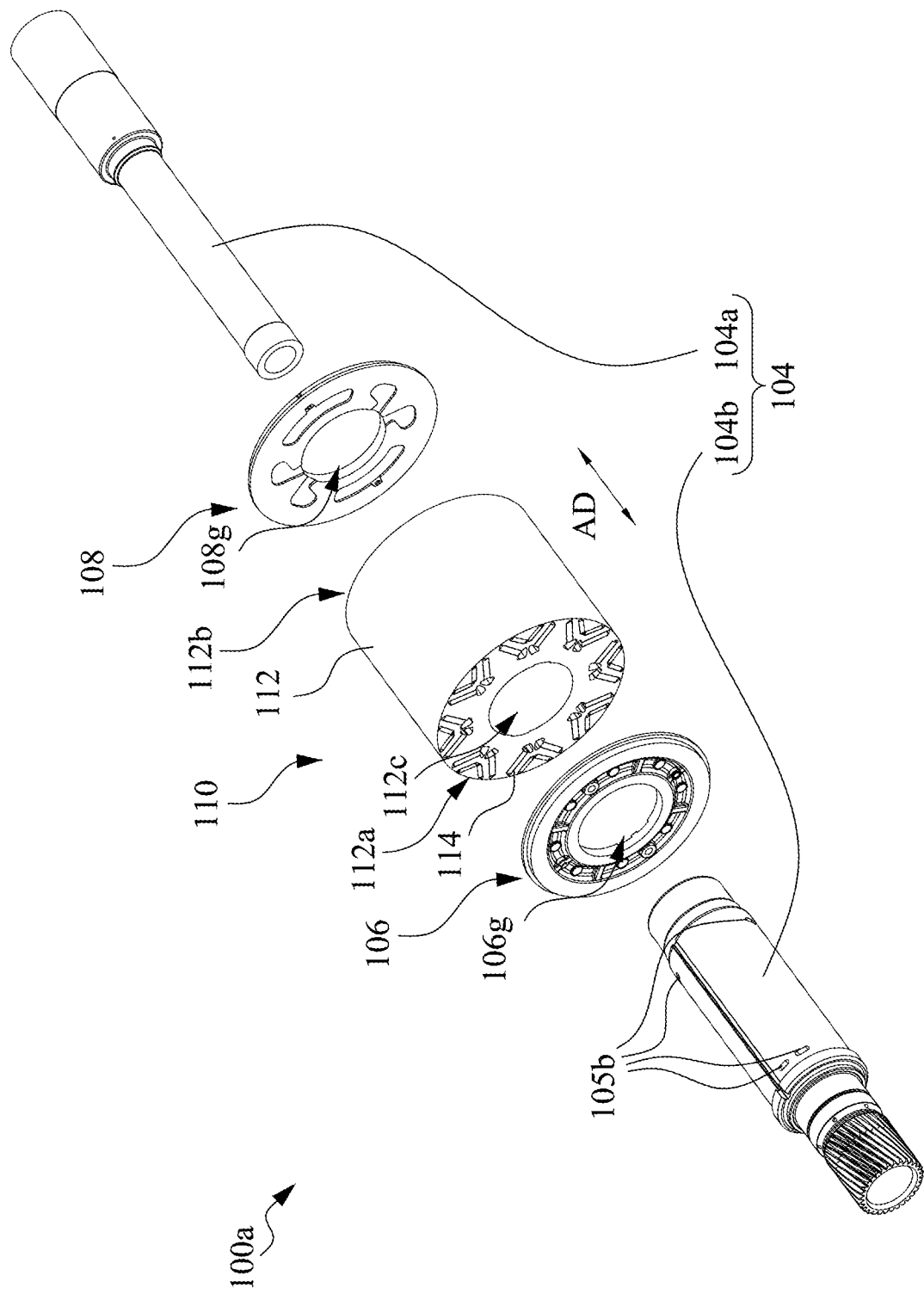
FIG. 1 illustrates an exploded view of a motor rotor cooling system according to a first embodiment of the present disclosure.

Reference will now be made in detail to the present embodiments, examples of which are illustrated in the accompanying drawings. Wherever possible, the same reference numbers are used in the drawings and the description to refer to the same or like parts.

Figure 2:
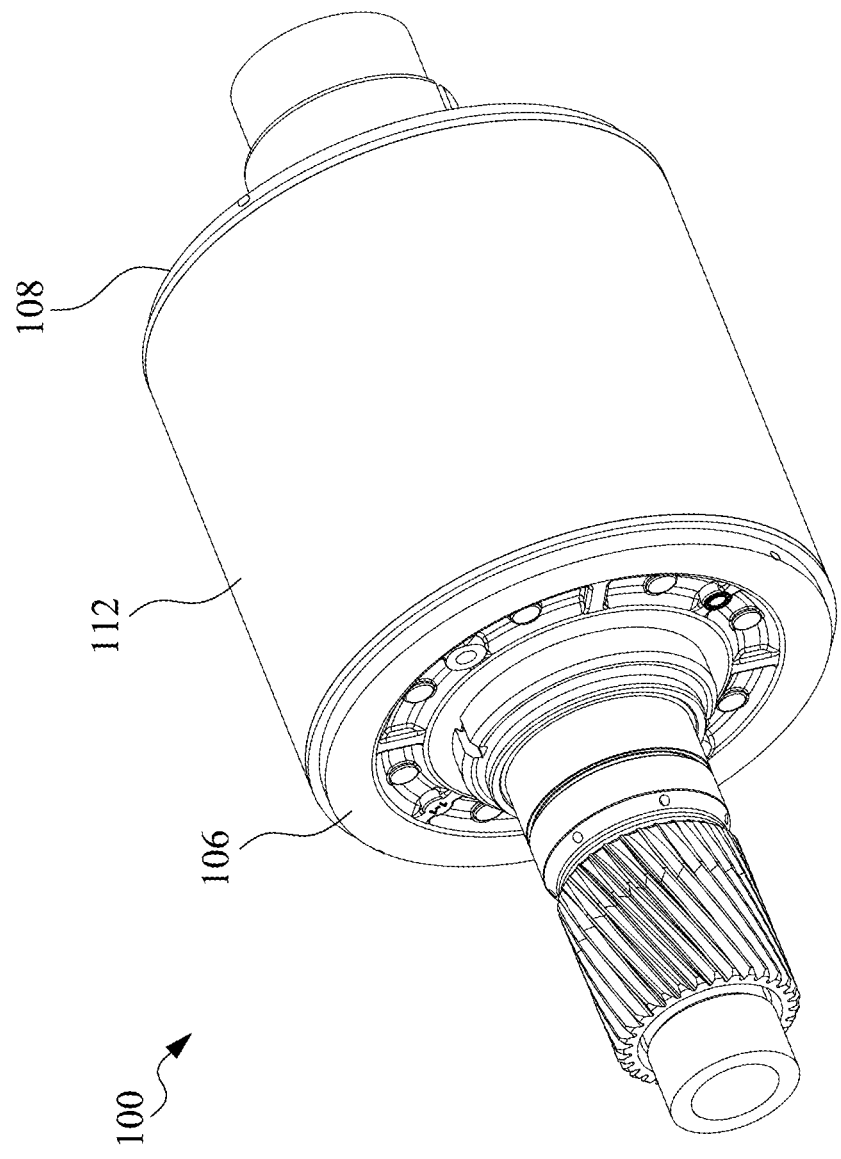
FIG. 2 illustrates a perspective view of a motor rotor cooling system according to some embodiments of the present disclosure.

Reference is made to FIGS. 1 and 2, FIG. 1 illustrates an exploded view of a motor rotor cooling system according to a first embodiment of the present disclosure, and FIG. 2 illustrates a perspective view of a motor rotor cooling system according to some embodiments of the present disclosure. A motor rotor cooling system 100a shown in FIG. 1 is assembled to obtain the motor rotor cooling system 100 shown in FIG. 2. The motor rotor cooling system 100a includes a rotor structure 110, a first end plate 106 and a second end plate 108, etc. The rotor structure 110 is composed of a silicon steel 112, magnets 114 and a shaft 104. The magnets 114 are embedded in the silicon steel 112 along an axial direction AD. The first end plate 106 is located at a first end 112a of the silicon steel 112, and the second end plate 108 is located at a second end 112b of the silicon steel 112. The shaft 104 is composed of an inner shaft 104a and an outer shaft 104b. The shaft 104 is inserted through a shaft hole 112c of the silicon steel 112, a shaft hole 106g of the first end plate 106 and a shaft hole 108g of the second end plate 108.

Figure 3:
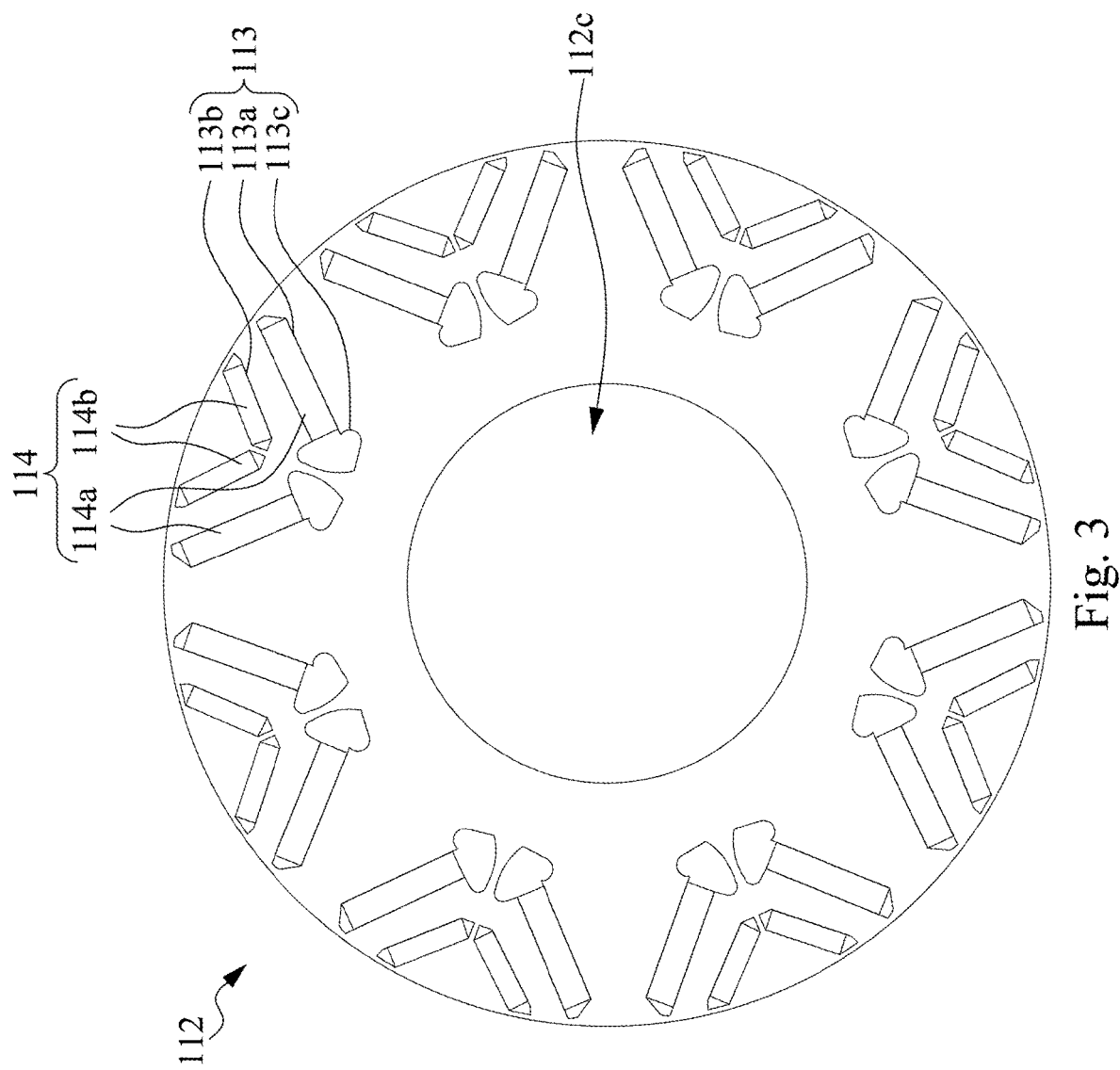
FIG. 3 illustrates an end view of a silicon steel according to some embodiments of the present disclosure.

Reference is made to FIG. 3, which illustrates an end view of a first end surface or a second end surface of the silicon steel according to the embodiment of the present invention. The silicon steel 112 is provided with magnet slots 113 along the axial direction to accommodate the magnets 114. The magnet slots 113 include larger magnet slots 113a for accommodating larger magnets 114a and smaller magnet slots 113b for accommodating smaller magnets 114b. A cross-sectional area of each magnet slot 113 is larger than a cross-sectional area of each corresponding magnet 114, such that some portions of the magnet slots (eg, the magnet slots 113c), which are not occupied by the magnets, can be used as oil passages passing through the silicon steel. The cooling fluid flowing in the magnet slots 113c can directly contact the inner walls of the magnets 114 and the silicon steel 112. In the embodiment of the present invention, the magnet slots 113c closer to the shaft hole are used such that the cooling fluid in the magnet slots 113c is less likely to leak from gaps of the laminated silicon steel.

Figure 4:
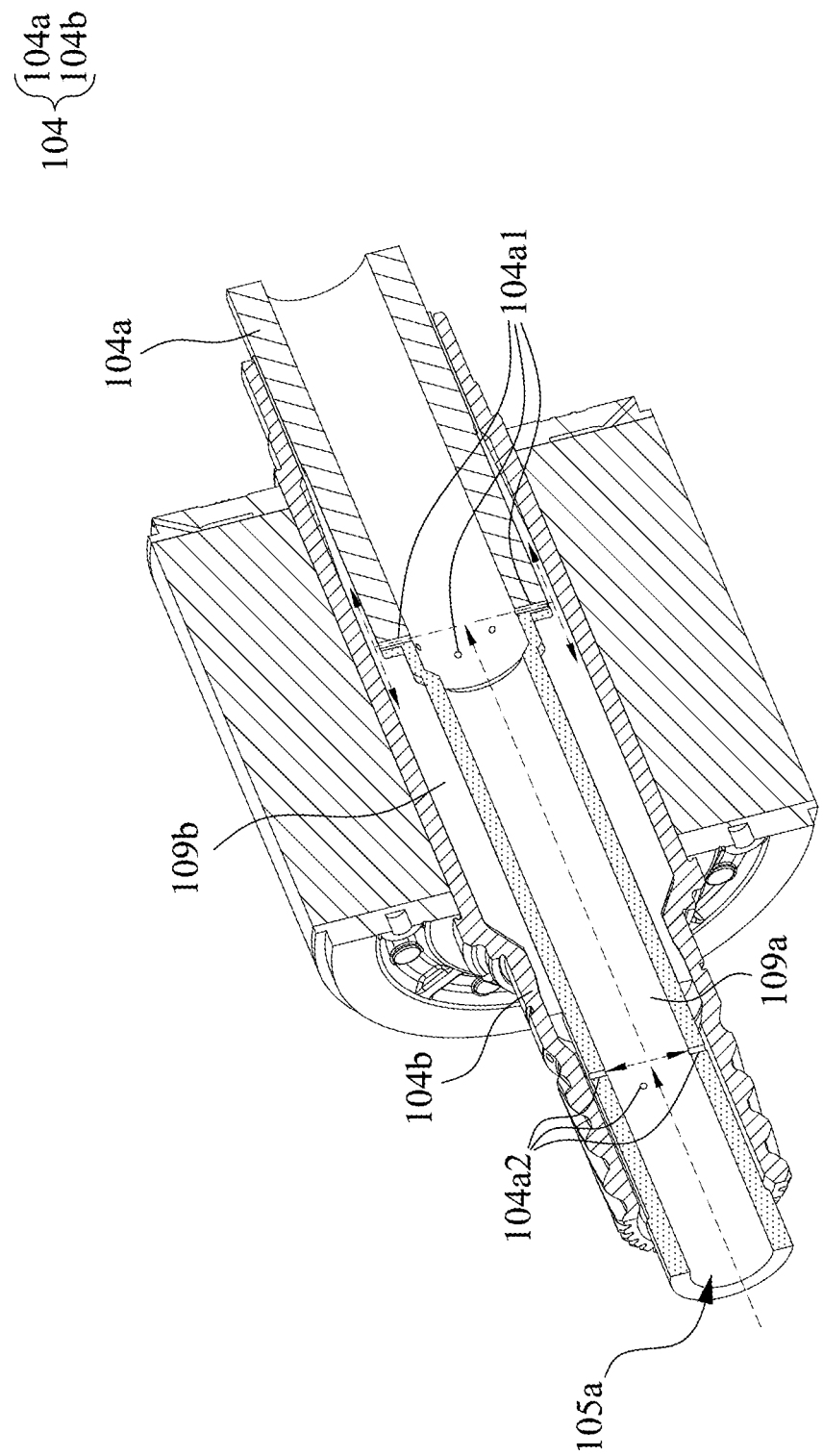
FIG. 4 illustrates a cross-sectional view of a motor rotor cooling system according to a first embodiment of the present disclosure.
Figure 5:
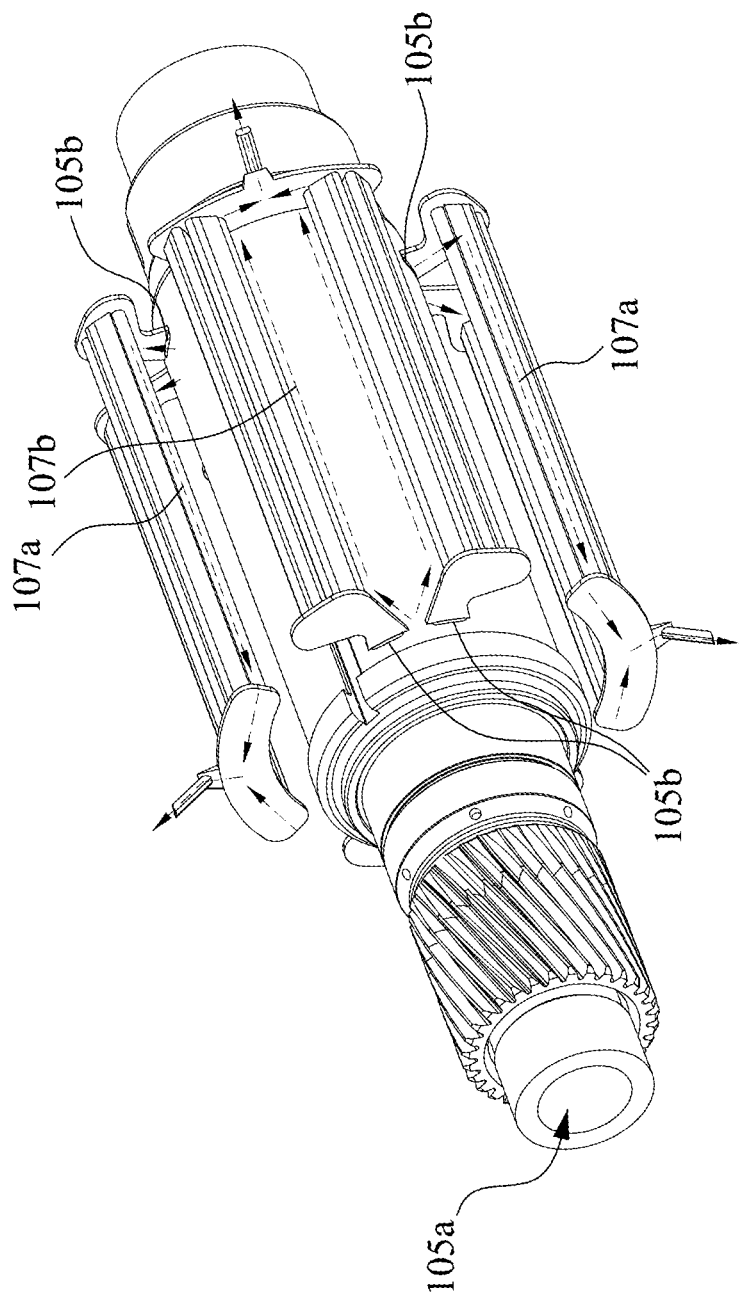
FIG. 5 illustrates how cooling fluid flow in a motor rotor cooling system according to a first embodiment of the present disclosure.
Figure 6:
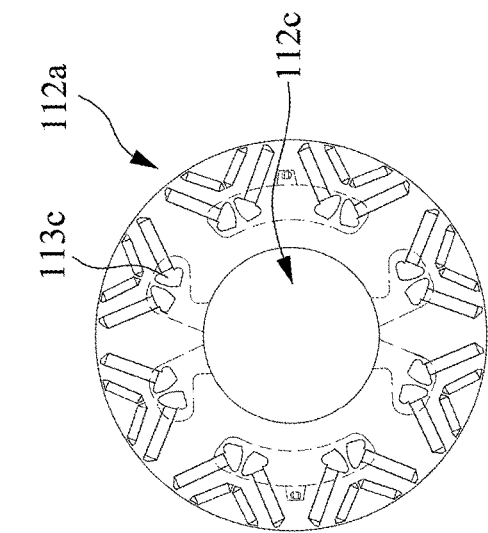
FIG. 6 illustrates a planar view (facing toward the silicon steel) of a first end plate of a motor rotor cooling system according to a first embodiment of the present disclosure.
Figure 8:
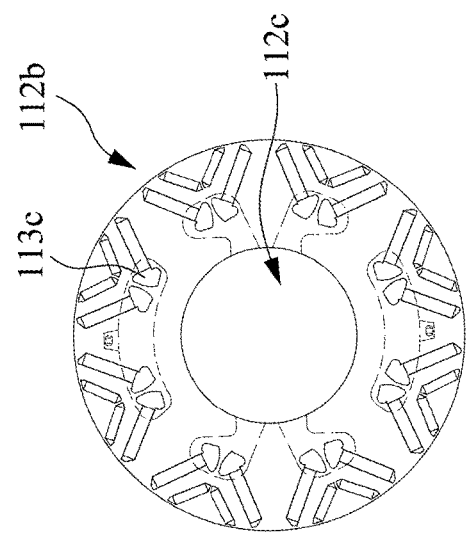
FIG. 8 illustrates a planar view (facing toward the silicon steel) of a second end plate of a motor rotor cooling system according to a first embodiment of the present disclosure.

Reference is made to FIGS. 4 and 5, FIG. 4 illustrates a cross-sectional view of a motor rotor cooling system according to a first embodiment of the present disclosure, and FIG. 5 illustrates how cooling fluid flow in a motor rotor cooling system according to a first embodiment of the present disclosure. In FIG. 5, the silicon steel, magnets, and the first and second end plates are removed to highlight how the fluid flows. The shaft 104 has a shaft oil channel, e.g., a shaft oil channel 109a is located inside the inner shaft 104a, and a shaft oil channel 109b is located between the inner shaft 104a and the outer shaft 104b. When a cooling system fluid (e.g., cooling oil) is entered into the shaft oil channel 109a from a shaft oil inlet 105a, and then entered into the shaft oil channel 109b via through holes 104a1 and 104a2 of the inner shaft 104a, and then flowed out of the outer shaft 104b via a shaft oil outlet 105b. Then, the fluid outputted through the shaft oil outlet 105b flows through the first and second end plates and the magnet slots in the directions of the arrows in FIG. 5 to form a first oil cooling path 107a and a second oil cooling path 107b.

Figure 7:
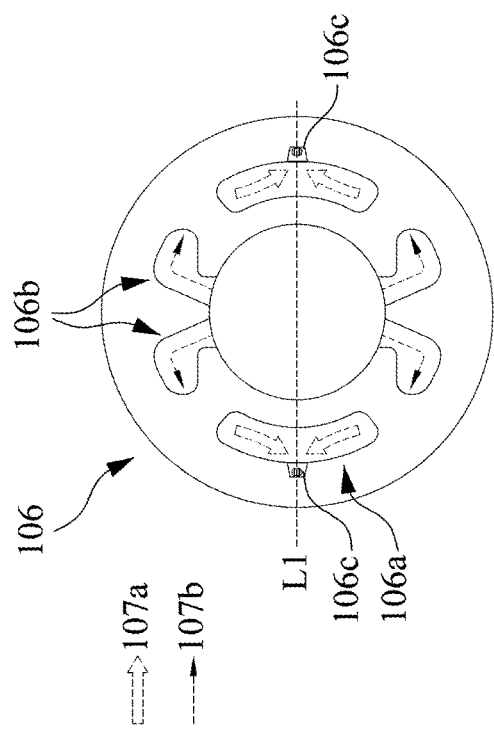
FIG. 7 illustrates a planar view of a first end of a silicon steel according to a first embodiment of the present disclosure.
Figure 9:
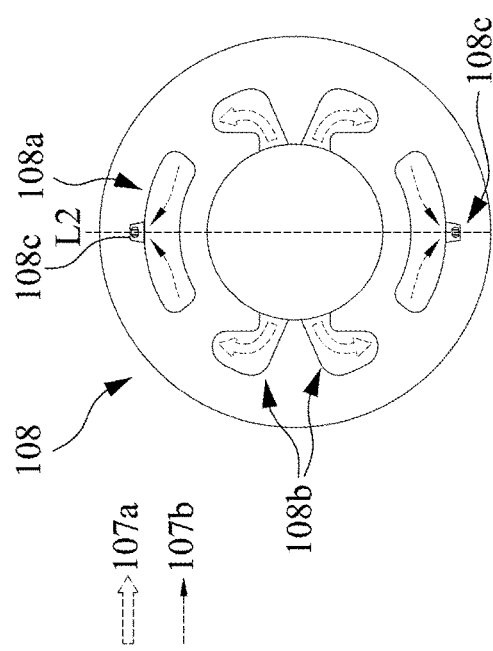
FIG. 9 illustrates a planar view of a second end of a silicon steel according to a first embodiment of the present disclosure.

Reference is made to FIGS. 5-9, FIGS. 6 and 8 illustrate respective planar views (facing toward the silicon steel) of a first end plate and a second end plate of a motor rotor cooling system according to a first embodiment of the present disclosure, and FIGS. 7 and 9 illustrate respective planar views of a first end and a second end of a silicon steel according to a first embodiment of the present disclosure. The first end plate 106 is configured to be located at the first end 112a of the silicon steel 112, and the first end plate 106 is recessed with at least a first-shaped oil groove 106a and a second-shaped oil groove 106b. The first end plate 106 has at least one first plate oil outlet 106c that is connected with the first-shaped oil groove 106a to be fluidly communicable. The second end plate 108 is configured to be located at the second end 112b of the silicon steel 112. The second end plate 108 is recessed with at least a first-shaped oil groove 108a and a second-shaped oil groove 108b. The second end plate 108 has at least one second plate oil outlet 108c that is connected with the first-shaped oil groove 108a to be fluidly communicable. The first oil cooling path 107a is sequentially connected from the shaft oil outlet 105b to the second-shaped oil groove 108b, the magnet slots 113c, the first-shaped oil groove 106a and the first plate oil outlet 106c to be fluidly communicable. The second oil cooling path 107b is sequentially connected from the shaft oil outlet 105b to the second-shaped oil groove 106b, the magnet slots 113c, the first-shaped oil groove 108a and the second plate oil outlet 108c to be fluidly communicable. In the first embodiment of the present invention, an overall shape formed by the first-shaped and second-shaped oil grooves of the first end plate 106 is substantially the same as an overall shape formed by the first-shaped and second-shaped oil grooves of the second end plate 108. In the first embodiment of the present invention, the first end plate 106 has two first plate oil outlets 106c, the second end plate 108 has two second plate oil outlets 108c, and a connection line L1 between the two first plate oil outlets 106c is perpendicular to a connection line L2 between the two second plate oil outlets 108c. In the first embodiment of the present invention, the motor rotor cooling system 100a forms two first oil cooling paths 107a and two second oil cooling paths 107b in total such that the motor rotor can be cooled more efficiently and uniformly.

Figure 10:
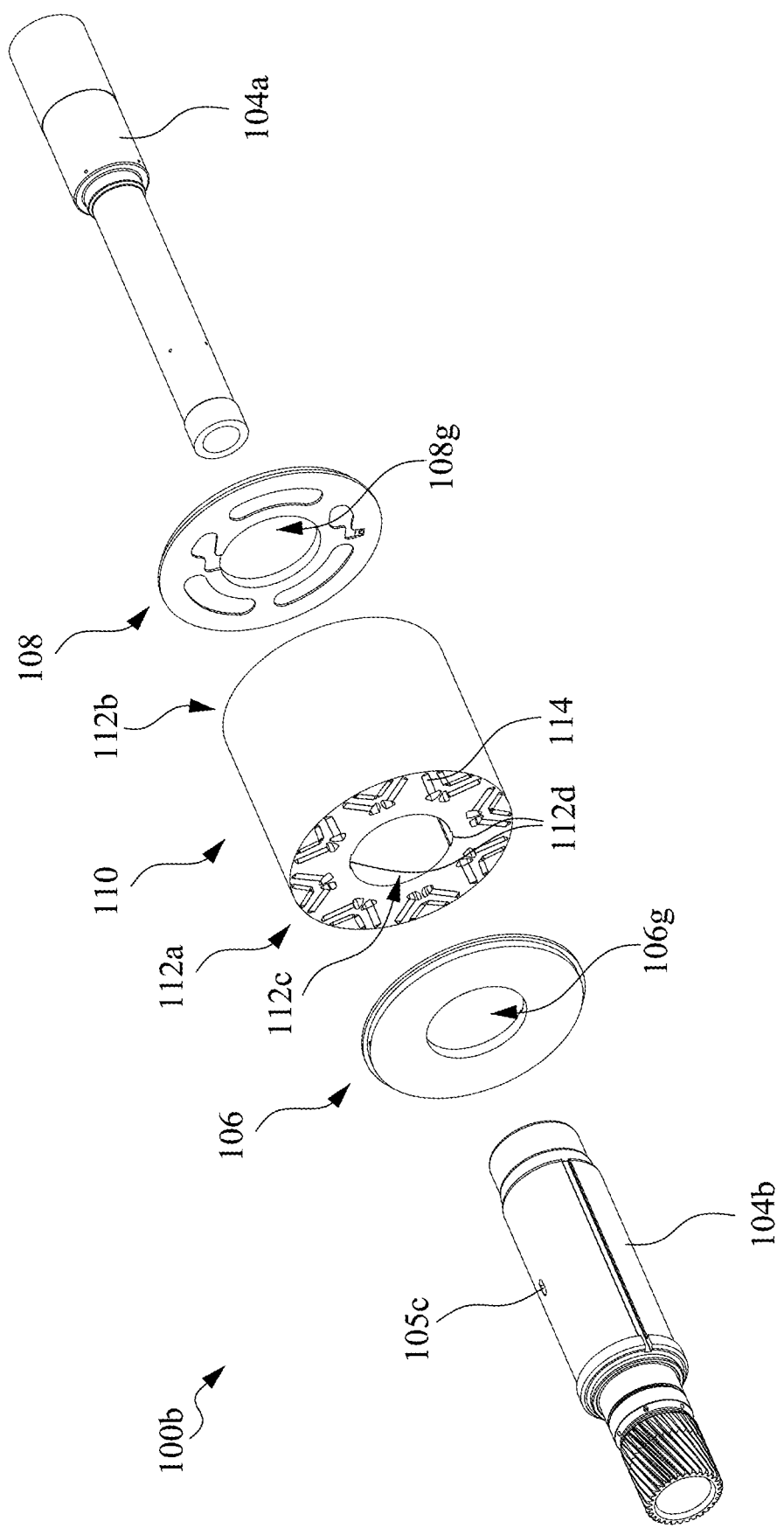
FIG. 10 illustrates an exploded view of a motor rotor cooling system according to a second embodiment of the present disclosure.

Reference is made to FIGS. 2 and 10, and FIG. 10 illustrates an exploded view of a motor rotor cooling system according to a second embodiment of the present disclosure. The motor rotor cooling system 100b illustrated in FIG. 10 is assembled to obtain the motor rotor cooling system 100 illustrated in FIG. 2. The motor rotor cooling system 100b and the motor rotor cooling system 100a both include a rotor structure 110, a first end plate 106, a second end plate 108 etc. There is no obvious difference in the appearance after these two motor rotor cooling systems being assembled. The main difference between these two systems lies in the internal cooling design. The cooling circulation design of the motor rotor cooling system 100b is described in detail below.

Figure 11:
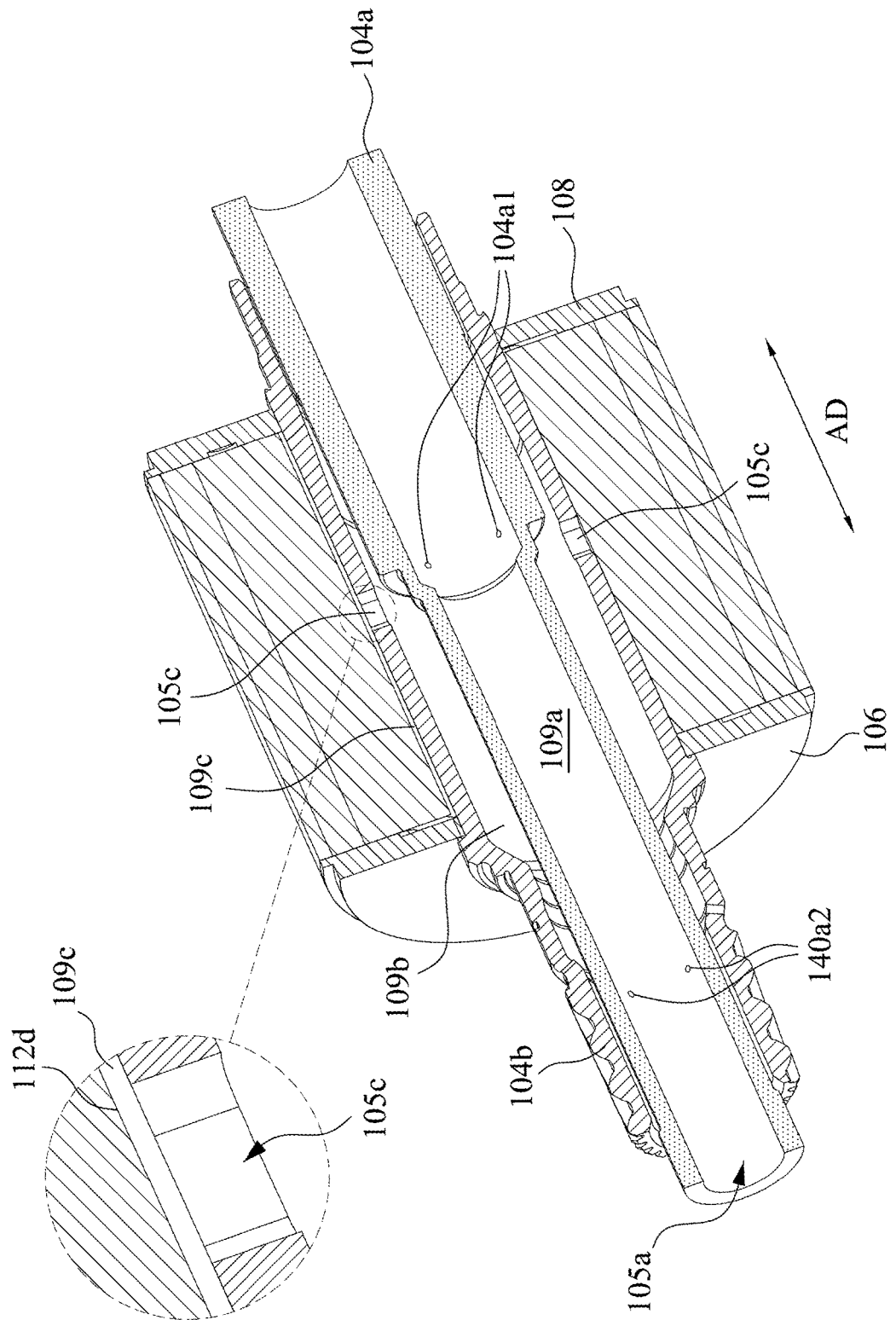
FIG. 11 illustrates a cross-sectional view of a motor rotor cooling system according to a second embodiment of the present disclosure.
Figure 12:
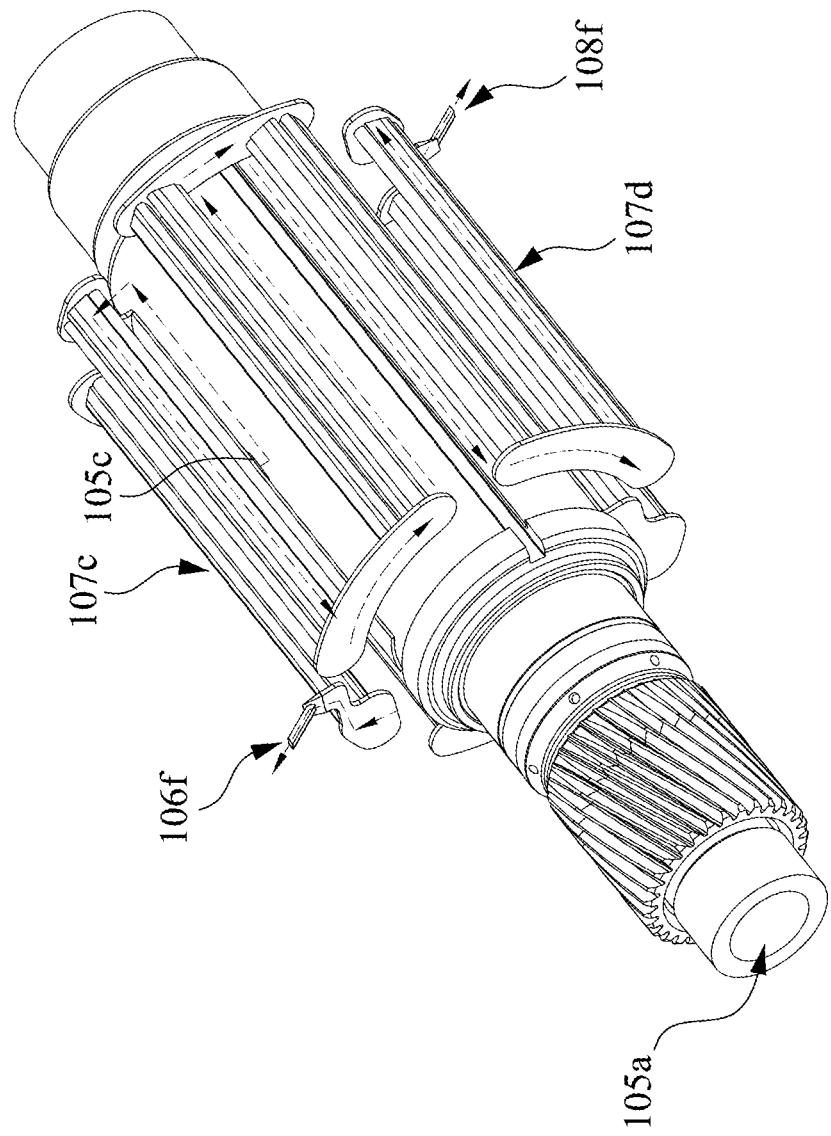
FIG. 12 illustrates how cooling fluid flow in a motor rotor cooling system according to a second embodiment of the present disclosure.

Reference is made to FIGS. 11 and 12, FIG. 11 illustrates a cross-sectional view of a motor rotor cooling system according to a second embodiment of the present disclosure, and FIG. 12 illustrates how cooling fluid flow in a motor rotor cooling system according to a second embodiment of the present disclosure. In FIG. 12, the silicon steel, magnets, and the first and second end plates are removed to highlight how the fluid flows. The shaft 104 has a shaft oil channel, the shaft oil channel 109a is located inside the inner shaft 104a, and the shaft oil channel 109b is located between the inner shaft 104a and the outer shaft 104b. When the cooling system fluid (e.g., cooling oil) is entered into the shaft oil channel 109a from the shaft oil inlet 105a, and entered into the shaft oil channel 109b through the through holes 104a1 and 104a2 of the inner shaft 104a, and then flowed out of the outer shaft 104b through the shaft oil outlet 105c. The silicon steel 112 also includes an axial groove 112d, and the axial groove 112d extends between the first end 112a and the second end 112b of the silicon steel 112 along the axial direction AD. An axial oil channel 109c is formed between the axial groove 112d and the outer shaft 104b. The shaft oil channel 109b fluidly communicates with the axial oil channel 109c via the shaft oil outlet 105c. Then, the fluid output from the shaft oil outlet 105c will flow through the first and second end plates and the magnet slots in the directions of the arrows in FIG. 12 to form a first oil cooling path 107c and a second oil cooling path 107d.

Figure 14:
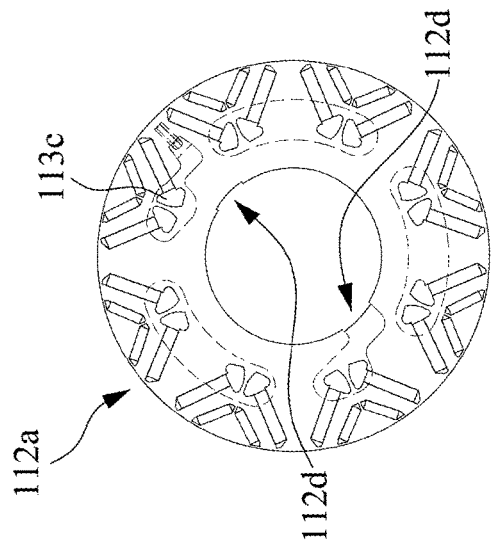
FIG. 14 illustrates a planar view of a first end of a silicon steel according to a second embodiment of the present disclosure.
Figure 16:
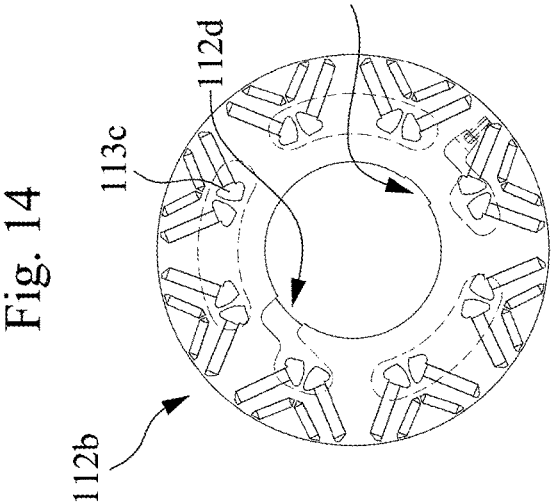
FIG. 16 illustrates a planar view of a second end of a silicon steel according to a second embodiment of the present disclosure.
Figure 13:
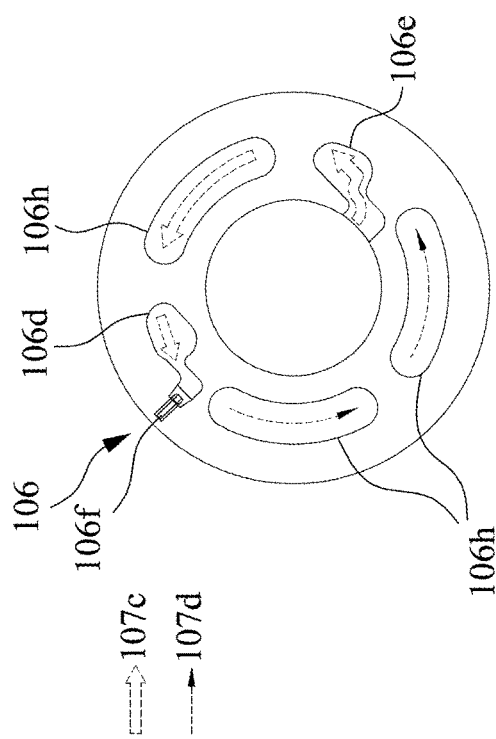
FIG. 13 illustrates a planar view (facing toward the silicon steel) of a first end plate of a motor rotor cooling system according to a second embodiment of the present disclosure.
Figure 15:
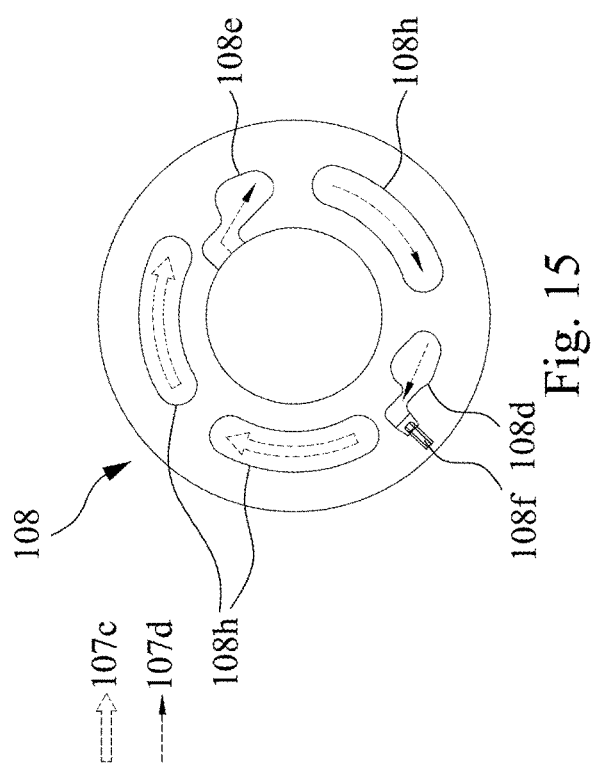
FIG. 15 illustrates a planar view (facing toward the silicon steel) of a second end plate of a motor rotor cooling system according to a second embodiment of the present disclosure.

Reference is made to FIGS. 12-16, FIGS. 13 and 15 illustrate respective planar views (facing toward the silicon steel) of a first end plate and a second end plate of a motor rotor cooling system according to a second embodiment of the present disclosure, and FIGS. 14 and 16 illustrate respective planar views of a first end and a second end of a silicon steel according to a second embodiment of the present disclosure. The first end plate 106 is configured to be located at the first end 112a of the silicon steel 112, and the first end plate 106 is recessed with a first-shaped oil groove 106d, a second-shaped oil groove 106e and at least one third-shaped oil groove 106h. The first end plate 106 has at least one first plate oil outlet 106f that is connected with the first-shaped oil groove 106d to be fluidly communicable. The second-shaped oil groove 106e is connected with the axial groove 112d to be fluidly communicable. The second end plate 108 is configured to be located at the second end 112b of the silicon steel 112. The second end plate 108 is recessed with a first-shaped oil groove 108d, a second-shaped oil groove 108e and at least one third-shaped oil groove 108h. The plate 108 has at least one second plate oil outlet 108f that is connected with the first-shaped oil groove 108d to be fluidly communicable. The second-shaped oil groove 108e is connected with the axial groove 112d to be fluidly communicable. The first oil cooling path 107c is sequentially from the shaft oil outlet 105c to the second-shaped oil groove 106e, the magnet slots 113c, the third-shaped oil groove 108h, the magnet slots 113c, the third-shaped oil groove 106h, the magnet slots 113c, the third-shaped oil groove 108h, magnet slots 113c, the first-shaped oil groove 106d and the first plate oil outlet 106f. The second oil cooling path 107d is sequentially connected from the shaft oil outlet 105c to the second-shaped oil groove 108e, the magnet slots 113c, the third-shaped oil groove 106h, the magnet slots 113c, the third-shaped oil groove 108h, the magnet slots 113c, the third-shaped oil groove oil groove 106h, the magnet slots 113c, the first-shaped oil groove 108d and the second plate oil outlet 108f. In the second embodiment of the present invention, an overall shape formed by the first-shaped, second-shaped and/or third-shaped oil grooves of the first end plate 106 is mirror-symmetrical to an overall shape formed by the first, second and/or third shape oil grooves of the second end plate 108. In the second embodiment of the present invention, after the first end plate 106 and the second end plate 108 are assembled on the two ends of the silicon steel, a position of the first plate oil outlet 106f of the first end plate 106 is offset by 180 degrees from a position of the second plate oil outlet 108f of the second end plate 108 (referring to FIG. 12). In the second embodiment of the present invention, the motor rotor cooling system 100b forms a first oil cooling path 107c and a second oil cooling path 107d in total such that the motor rotor can be cooled more efficiently and uniformly.

The motor rotor cooling system disclosed herein is equipped with a plurality of different cooling oil paths through the oil grooves of different shapes recessed on the first and second end plates and a plurality of magnet slots running through the silicon steel such that the motor rotor can be cooled more efficiently and uniformly.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A motor rotor cooling system comprising:
   a rotor structure comprising a silicon steel, magnets and a shaft, the shaft has a shaft oil channel, a shaft oil inlet and a shaft oil outlet, wherein the shaft oil inlet and the shaft oil outlet is connected to the shaft oil channel, the silicon steel has magnet slots to accommodate the magnets respectively;
   a first end plate disposed at a first end of the silicon steel, the first end plate is recessed to form at least one first-shaped oil groove and at least one second-shaped oil groove, the first end plate has at least one first plate oil outlet that is connected to the first-shaped oil groove; and a second end plate disposed at a second end of the silicon steel, the second end plate is recessed to form at least another first-shaped oil groove and at least another second-shaped oil groove, the second end plate has at least one second plate oil outlet that is connected to the first-shaped oil groove of the second end plate, wherein the first-shaped oil groove of the first end plate is connected to the second-shaped oil groove of the second end plate via a corresponding one of the magnet slots to form a first oil cooling path, and the second-shaped oil groove of the first end plate is connected to the first-shaped oil groove of the second end plate via a corresponding one of the magnet slots to form a second oil cooling path.

2. The motor rotor cooling system of claim 1, wherein an overall shape formed by the first-shaped and second-shaped oil grooves of the first end plate is substantially the same as an overall shape formed by the first-shaped and second-shaped oil grooves of the second end plate.

3. The motor rotor cooling system of claim 1, wherein the shaft oil outlet is connected to the second-shaped oil groove of the first end plate.

4. The motor rotor cooling system of claim 1, wherein the shaft oil outlet is connected to the second-shaped oil groove of the second end plate.

5. The motor rotor cooling system of claim 1, wherein the at least one first plate oil outlet comprises two first plate oil outlets, the at least one second plate oil outlet comprises two second plate oil outlets, a connection line between the two first plate oil outlets is perpendicular to a connection line between the two second plate oil outlets.

6. The motor rotor cooling system of claim 1, wherein an overall shape formed by the first-shaped and second-shaped oil grooves of the first end plate is mirror-symmetrical to an overall shape formed by the first-shaped and second-shaped oil grooves of the second end plate.

7. The motor rotor cooling system of claim 6, wherein the silicon steel further comprises an axial groove extending between the first end and the second end of the silicon steel, and an axial oil channel is formed between the axial groove and the shaft.

8. The motor rotor cooling system of claim 7, wherein the shaft oil outlet is disposed between the first end plate and the second end plate and is connected to the second-shaped oil groove of the first end plate or the second-shaped oil groove of the second end plate via the axial oil channel.

9. The motor rotor cooling system of claim 6, wherein the first plate oil outlet of the first end plate is offset by 180 degrees from the second plate oil outlet of the second end plate.

10. The motor rotor cooling system of claim 6, wherein the first end plate is further recessed to form at least one third-shaped oil groove, the second end plate is further recessed to form at least another third-shaped oil groove, and an overall shape formed by the first-shaped, second-shaped and third-shaped oil grooves of the first end plate is mirror-symmetrical to an overall shape formed by the first-shaped, second-shaped and third-shaped oil grooves of the second end plate.

11. The motor rotor cooling system of claim 1, wherein the shaft includes an inner shaft and an outer shaft, and the shaft oil outlet is located on the outer shaft.

12. The motor rotor cooling system of claim 1, wherein a cross-sectional area of each magnet slot is larger than a cross-sectional area of a corresponding one of the magnets.

13. The motor rotor cooling system of claim 1, wherein a portion of each magnet slot, which is not occupied by a corresponding one of the magnets, forms an oil passage in the silicon steel.

14. A motor rotor cooling system comprising:
a rotor structure comprising a silicon steel, magnets and a shaft, the shaft has a shaft oil channel, a shaft oil inlet and a shaft oil outlet, wherein the shaft oil inlet and the shaft oil outlet is connected to the shaft oil channel, the silicon steel has magnet slots to receive the magnets respectively;
a first end plate disposed at a first end of the silicon steel, the first end plate is recessed to form at least one first-shaped oil groove and at least one second-shaped oil groove, the first end plate has at least one first plate oil outlet that is connected to the first-shaped oil groove; and
a second end plate disposed at a second end of the silicon steel, the second end plate is recessed to form at least another first-shaped oil groove and at least another second-shaped oil groove, the second end plate has at least one second plate oil outlet that is connected to the first-shaped oil groove of the second end plate,
wherein an overall shape formed by the first-shaped and second-shaped oil grooves of the first end plate is substantially the same as an overall shape formed by the first-shaped and second-shaped oil grooves of the second end plate.

15. The motor rotor cooling system of claim 14, wherein the shaft oil outlet is connected to the second-shaped oil groove of the first end plate and the shaft oil outlet is connected to the second-shaped oil groove of the second end plate.

16. The motor rotor cooling system of claim 14, wherein the at least one first plate oil outlet comprises two first plate oil outlets, the at least one second plate oil outlet comprises two second plate oil outlets, a connection line between the two first plate oil outlets is perpendicular to a connection line between the two second plate oil outlets.

17. A motor rotor cooling system comprising:
a rotor structure comprising a silicon steel, magnets and a shaft, the shaft has a shaft oil channel, a shaft oil inlet and a shaft oil outlet, wherein the shaft oil inlet and the shaft oil outlet is connected to the shaft oil channel, the silicon steel has magnet slots to receive the magnets respectively;
a first end plate disposed at a first end of the silicon steel, the first end plate is recessed to form at least one first-shaped oil groove and at least one second-shaped oil groove, the first end plate has at least one first plate oil outlet that is connected to the first-shaped oil groove; and
a second end plate disposed at a second end of the silicon steel, the second end plate is recessed to form at least another first-shaped oil groove and at least another second-shaped oil groove, the second end plate has at least one second plate oil outlet that is connected to the first-shaped oil groove of the second end plate,
wherein an overall shape formed by the first-shaped and second-shaped oil grooves of the first end plate is mirror-symmetrical to an overall shape formed by the first-shaped and second-shaped oil grooves of the second end plate.

18. The motor rotor cooling system of claim 17, wherein the silicon steel further comprise an axial groove extending between the first end and the second end of the silicon steel, and an axial oil channel is formed between the axial groove and the shaft.

19. The motor rotor cooling system of claim 18, wherein the shaft oil outlet is disposed between the first end plate and the second end plate and is connected to the second-shaped oil groove of the first end plate or the second-shaped oil groove of the second end plate via the axial oil channel.

20. The motor rotor cooling system of claim 17, wherein the first end plate is further recessed to form at least one third-shaped oil groove, the second end plate is further recessed to form at least another third-shaped oil groove, and an overall shape formed by the first-shaped, second-shaped and third-shaped oil grooves of the first end plate is mirror-symmetrical to an overall shape formed by the first-shaped, second-shaped and third-shaped oil grooves of the second end plate.

* * * * *